United States Patent
Xiong et al.

(10) Patent No.: US 9,477,297 B2
(45) Date of Patent: Oct. 25, 2016

(54) COMPUTER SYSTEM AND MATCHING CIRCUIT THEREOF

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jin-Liang Xiong, Wuhan (CN); Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 133 days.

(21) Appl. No.: 14/575,773

(22) Filed: Dec. 18, 2014

(65) Prior Publication Data
US 2016/0139653 A1    May 19, 2016

(30) Foreign Application Priority Data
Nov. 17, 2014   (CN) .......................... 2014 1 0651315

(51) Int. Cl.
*G06F 1/32*    (2006.01)
(52) U.S. Cl.
CPC ........... *G06F 1/3287* (2013.01); *G06F 1/3293* (2013.01); *G06F 1/3296* (2013.01)
(58) Field of Classification Search
CPC .. G06F 1/3287; G06F 1/3293; G06F 1/3296; G06F 1/32; G06F 1/28
USPC .................................................. 713/323, 340
See application file for complete search history.

(56) References Cited

U.S. PATENT DOCUMENTS

| 7,634,674 | B2* | 12/2009 | Chen ..................... | G06F 1/26 713/300 |
|---|---|---|---|---|
| 8,166,331 | B2* | 4/2012 | Zou ..................... | G06F 1/26 713/340 |
| 2010/0325464 | A1* | 12/2010 | Hu ..................... | G06F 1/26 713/330 |
| 2013/0162036 | A1* | 6/2013 | Mangattur ............. | G06F 1/26 307/18 |

* cited by examiner

*Primary Examiner* — Thomas Lee
*Assistant Examiner* — Aaron J Browne
(74) *Attorney, Agent, or Firm* — Zhigang Ma

(57) ABSTRACT

A computer system includes a power supply unit (PSU), a matching circuit, and a chip. The matching circuit includes a voltage conversion unit, a voltage-dividing unit, a first resistor, a comparator, a diode, and a delay unit. The comparator includes a non-inverting terminal electrically coupled to the PSU to receive a power-good signal, an inverting terminal electrically coupled to the voltage-dividing unit to receive a reference voltage, and an output terminal. The delay unit is electrically coupled to a power supply and a power-good signal pin of the chip. When a voltage of the power-good signal is greater than the reference voltage, the output terminal of the comparator outputs a high level signal, the diode is turned off and the power supply is delayed by the delay unit and then output to the power-good signal pin of the chip.

12 Claims, 2 Drawing Sheets

COMPUTER SYSTEM AND MATCHING CIRCUIT THEREOF

FIELD

The subject matter herein generally relates to computer systems, and particularly to a computer system with a matching circuit.

BACKGROUND

Power supply units (PSUs) supply power to motherboards of computers. However, if a timing sequence of a power-good signal of a PSU does not match a timing sequence of a power-good signal of a chip of a motherboard, or if a voltage of the power-good signal of the PSU does not match a voltage of the power-good signal of the chip of the motherboard, the motherboard would not operate.

BRIEF DESCRIPTION OF THE DRAWINGS

Implementations of the present technology will now be described, by way of example only, with reference to the attached figures.

DETAILED DESCRIPTION

Figure 1:
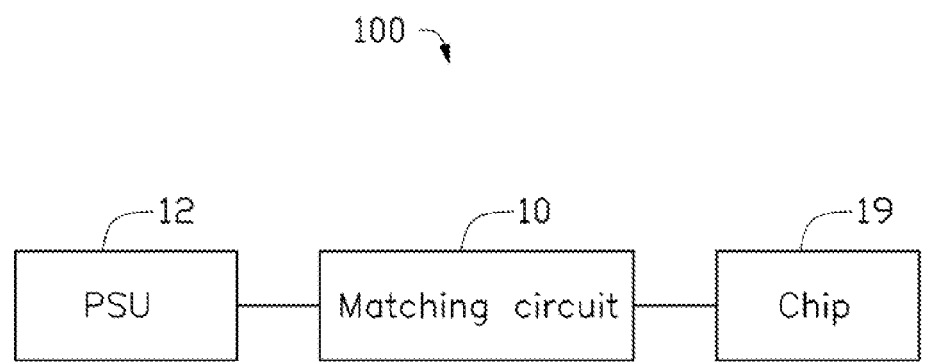
FIG. 1 is a block diagram of a computer system comprising a matching circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an embodiment of a computer system 100. The computer system 100 can comprise a matching circuit 10, a power supply unit (PSU) 12, and a chip 19. The matching circuit 10 is electrically coupled to the PSU 12 and the chip 19, to match the PSU 12 with the chip 19.

Figure 2:
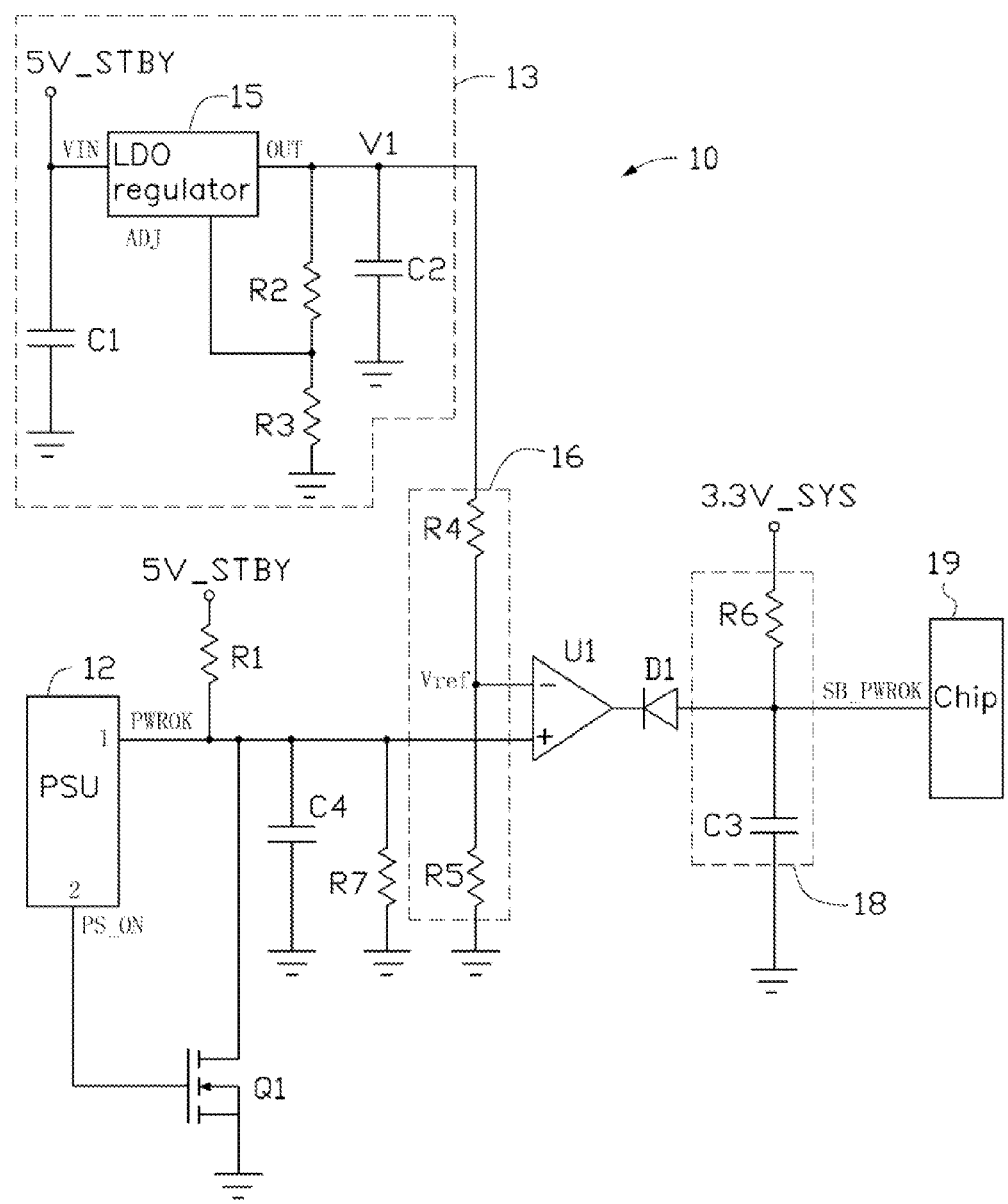
FIG. 2 is a circuit diagram of the computer system of FIG. 1.

FIG. 2 illustrates an embodiment of the matching circuit 10. The matching circuit 10 can comprise a voltage conversion unit 13, a voltage-dividing unit 16, a delay unit 18, an electronic switch Q1, a comparator U1, and a diode D1.

The PSU 12 can comprise a first pin 1 and a second pin 2. The electronic switch Q1 can comprise a first terminal, a second terminal, and a third terminal. The comparator U1 can comprise a non-inverting terminal, an inverting terminal, and an output terminal. The first pin 1 is electrically coupled to a power supply 5V_STBY through a resistor R1, electrically coupled to the non-inverting terminal of the comparator U1, electrically coupled to a ground through a capacitor C4, and electrically coupled to the ground through a resistor R7. The first terminal of the electronic switch Q1 is electrically coupled to the second pin 2. The second terminal of the electronic switch Q1 is electrically coupled to the first pin 1. The third terminal of the electronic switch Q1 is grounded.

The voltage conversion unit 13 can comprise a low dropout (LDO) regulator 15. The LDO regulator 15 can comprise a first input terminal VIN, a second input terminal ADJ, and an output terminal OUT. The first input terminal VIN is electrically coupled to the power supply 5V_STBY, and electrically coupled to the ground through a capacitor C1. The second input terminal ADJ is electrically coupled to the output terminal OUT through a resistor R2, and is electrically coupled to the ground through a resistor R3. The output terminal OUT is electrically coupled to the ground through a capacitor C2, and is electrically coupled to the inverting terminal of the comparator U1 through the voltage-dividing unit 16.

The voltage-dividing unit 16 can comprise two resistors R4 and R5. The delay unit 18 can comprises a resistor R6 and a capacitor C3. The chip 19 can comprise a power-good signal pin SB_PWROK. The inverting terminal of the comparator U1 is electrically coupled to the output terminal OUT of the LDO regulator 15 through the resistor R4, and is electrically coupled to the ground through the resistor R5. The output terminal of the comparator U1 is electrically coupled to a cathode of the diode D1. The power-good signal pin SB_PWROK of the chip 19 is electrically coupled to an anode of the diode D1, electrically coupled to a power supply 3.3V_SYS through the resistor R6, and electrically coupled to the ground through the capacitor C3.

When the PSU 12 is powered on, the first pin 1 of the PSU 12 outputs a power-good signal PWROK to the non-inverting terminal of the comparator U1, and the second pin 2 of the PSU 12 outputs a power on signal PS_ON at a low level to turn off the electronic switch Q1. The LDO regulator 15 converts a voltage of the power supply 5V_STBY received from the first input terminal VIN into a first voltage V1, and outputs the first voltage V1 to the voltage-dividing unit 16 from the output terminal OUT. The first voltage V1 is divided by the resistors R4 and R5, and a voltage of the resistor R5 functioning as a reference voltage Vref is output to the inverting terminal of the comparator U1. When a voltage of the power-good signal PWROK is greater than the reference voltage Vref, the output terminal OUT of the comparator U1 outputs a high level signal, the diode D1 is turned off, the power supply 3.3V_SYS is delayed by the delay unit 18, and then is output to the power-good signal pin SB_PWROK of the chip 19. Because of a voltage of the power supply 3.3V_SYS meets a voltage requirement of a power-good signal of the chip 19, and the power supply 3.3V_SYS is delayed by the delay unit 18 to meet a timing sequence requirement of the power-good signal of the chip 19, both a voltage and a timing sequence of a signal received by the power-good signal pin SB_PWROK of the chip 19 match the voltage and the timing sequence of the power-good signal of the chip 19. Therefore, the PSU 12 is matched with the chip 19 by the matching circuit 10.

When the computer system 100 is turned off, the second pin 2 of the PSU 12 outputs the power on signal PS_ON at a high level to turn on the electronic switch Q1. At the moment, the non-inverting terminal of the comparator U1 receives a low level signal regardless the power-good signal PWROK output from the first pin 1 is at a high level or a low level. The output terminal of the comparator U1 outputs a low level signal, the diode D1 is turned on, and the power-good signal pin SB_PWROK of the chip 19 receives a low level signal. As detailed above, when the electronic switch Q1 is turned on by the high level power on signal PS_ON, the power-good signal PWROK output from the first pin 1 is pulled to a low level. Therefore, malfunction caused by fluctuation of the power-good signal PWROK can be effectively prevented.

In at least one embodiment, the chip 19 can be a motherboard chip, such as a south bridge, a north bridge, and a central processing unit. The electronic switch Q1 can be an re-channel metal-oxide semiconductor field-effect transistor (NMOSFET), and the first terminal, the second terminal, and the third terminal of the electronic switch Q1 correspond to a gate, a drain, and a source of the NMOSFET, respectively. In other embodiments, the electronic switch Q1 can be an npn-type bipolar junction transistor or other suitable switch having similar functions.

The embodiments shown and described above are only examples. Many details are often found in the art such as the other features of the computer system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A matching circuit, to match a power supply unit (PSU) with a chip, the matching circuit comprising:
    a first resistor;
    a voltage conversion unit electrically coupled to a first power supply, and configured to convert a voltage of the first power supply into a first voltage;
    a voltage-dividing unit electrically coupled to the voltage conversion unit and configured to receive the first voltage and divide the first voltage to form a reference voltage;
    a comparator comprising:
        a non-inverting terminal electrically coupled to a first pin of the PSU to receive a power-good signal, and electrically coupled to the first power supply through the first resistor;
        an inverting terminal electrically coupled to the voltage-dividing unit to receive the reference voltage; and
        an output terminal;
    a diode comprising an anode and a cathode electrically coupled to the output terminal of the comparator; and
    a delay unit electrically coupled to the anode of the diode, a second power supply, and a power-good signal pin of the chip;
    the matching circuit configured such that, in response to a voltage of the power-good signal output from the first pin of the PSU being greater than the reference voltage, the output terminal of the comparator outputs a high level signal, the diode is turned off, and the second power supply is delayed by the delay unit and then output to the power-good signal pin of the chip.

2. The matching circuit of claim 1, further comprising an electronic switch comprising:
    a first terminal electrically coupled to a second pin of the PSU to receive a power on signal;
    a second terminal electrically coupled to the non-inverting terminal of the comparator; and
    a third terminal electrically coupled to a ground;
    wherein in response to the second pin of the PSU outputting the power on signal at a high level signal, the electronic switch is turned on, the non-inverting terminal of the comparator receives a low level signal, the output terminal outputs a low level signal, the diode is turned on, and the power-good signal pin of the chip receives a low level signal.

3. The matching circuit of claim 1, wherein the voltage conversion unit comprises:
    a second resistor and a third resistor; and
    a low dropout (LDO) regulator comprising:
        an output terminal electrically coupled to the voltage-dividing unit to output the first voltage to the voltage-dividing unit;
        a first input terminal electrically coupled to the first power supply; and
        a second input terminal electrically coupled to the output terminal of the LDO regulator through the second resistor, and electrically coupled to a ground through the third terminal.

4. The matching circuit of claim 3, wherein the voltage conversion unit further comprises a first capacitor and a second capacitor, the first input terminal of the LDO regulator is electrically coupled to the ground through the first capacitor, and the output terminal of the LDO regulator is electrically coupled to the ground through the second capacitor.

5. The matching circuit of claim 3, wherein the voltage-dividing unit comprises a fourth resistor and a fifth resistor, the inverting terminal of the comparator is electrically coupled to the output terminal of the LDO regulator through the fourth resistor, and is electrically coupled to the ground through the fifth resistor.

6. The matching circuit of claim 1, wherein the delay unit comprises a sixth resistor and a third capacitor, the power-good signal pin of the chip is electrically coupled the second power supply through the sixth resistor, and is electrically coupled to the ground through the third capacitor.

7. A computer system comprising:
    a power supply unit (PSU) comprising a first pin outputting a power-good signal;
    a chip comprising a power-good signal pin; and
    a matching circuit comprising:
        a first resistor;
        a voltage conversion unit electrically coupled to a first power supply, and configured to convert a voltage of the first power supply into a first voltage;
        a voltage-dividing unit electrically coupled to the voltage conversion unit and configured to receive the first voltage and divide the first voltage to form a reference voltage;
        a comparator comprising:
            a non-inverting terminal electrically coupled to the first pin of the PSU to receive the power-good signal, and electrically coupled to the first power supply through the first resistor;
an inverting terminal electrically coupled to the voltage-dividing unit to receive the reference voltage; and
an output terminal;
a diode comprising an anode and a cathode electrically coupled to the output terminal of the comparator; and
a delay unit electrically coupled to the anode of the diode, a second power supply, and the power-good signal pin of the chip;
the matching circuit configured such that, in response to a voltage of the power-good signal output from the first pin of the PSU being greater than the reference voltage, the output terminal of the comparator outputs a high level signal, the diode is turned off, and the second power supply is delayed by the delay unit and then output to the power-good signal pin of the chip.

8. The computer system of claim 7, wherein the PSU further comprises a second pin to output a power on signal, and the matching circuit further comprises an electronic switch comprising:
a first terminal electrically coupled to the second pin of the PSU to receive the power on signal;
a second terminal electrically coupled to the non-inverting terminal of the comparator; and
a third terminal electrically coupled to a ground;
wherein in response to the second pin of the PSU outputting the power on signal at a high level signal, the electronic switch is turned on, the non-inverting terminal of the comparator receives a low level signal, the output terminal outputs a low level signal, the diode is turned on, and the power-good signal pin of the chip receives a low level signal.

9. The computer system of claim 7, wherein the voltage conversion unit comprises:
a second resistor and a third resistor; and
a low dropout (LDO) regulator comprising:
an output terminal electrically coupled to the voltage-dividing unit to output the first voltage to the voltage-dividing unit;
a first input terminal electrically coupled to the first power supply; and
a second input terminal electrically coupled to the output terminal of the LDO regulator through the second resistor, and electrically coupled to a ground through the third terminal.

10. The computer system of claim 9, wherein the voltage conversion unit further comprises a first capacitor and a second capacitor, the first input terminal of the LDO regulator is electrically coupled to the ground through the first capacitor, and the output terminal of the LDO regulator is electrically coupled to the ground through the second capacitor.

11. The computer system of claim 9, wherein the voltage-dividing unit comprises a fourth resistor and a fifth resistor, the inverting terminal of the comparator is electrically coupled to the output terminal of the LDO regulator through the fourth resistor, and is electrically coupled to the ground through the fifth resistor.

12. The computer system of claim 7, wherein the delay unit comprises a sixth resistor and a third capacitor, the power-good signal pin of the chip is electrically coupled the second power supply through the sixth resistor, and is electrically coupled to the ground through the third capacitor.

* * * * *